US011370202B2

(12) United States Patent
Matsuda et al.

(10) Patent No.: US 11,370,202 B2
(45) Date of Patent: Jun. 28, 2022

(54) DECORATIVE MOLDING SHEET, PREFORM MOLDING BODY, AND DECORATIVE MOLDED BODY

(71) Applicant: KURARAY CO., LTD., Kurashiki (JP)

(72) Inventors: Daisuke Matsuda, Okayama (JP); Michinori Fujisawa, Okayama (JP); Toshiyuki Ito, Tokyo (JP)

(73) Assignee: KURARAY CO., LTD., Kurashiki (JP)

( * ) Notice: Subject to any disclaimer, the term of this patent is extended or adjusted under 35 U.S.C. 154(b) by 50 days.

(21) Appl. No.: 15/733,234

(22) PCT Filed: Dec. 19, 2018

(86) PCT No.: PCT/JP2018/046734
§ 371 (c)(1),
(2) Date: Jun. 15, 2020

(87) PCT Pub. No.: WO2019/138816
PCT Pub. Date: Jul. 18, 2019

(65) Prior Publication Data
US 2021/0094268 A1 Apr. 1, 2021

(30) Foreign Application Priority Data
Jan. 9, 2018 (JP) .............................. JP2018-001073

(51) Int. Cl.
*B32B 27/40* (2006.01)
*B32B 27/12* (2006.01)
(Continued)

(52) U.S. Cl.
CPC .............. *B32B 27/12* (2013.01); *B32B 5/022* (2013.01); *B32B 27/306* (2013.01); *B32B 27/40* (2013.01);
(Continued)

(58) Field of Classification Search
CPC .............. B29C 45/14; B29C 45/14336; B29K 2055/02; B29K 2627/06; B29K 2631/04;
(Continued)

(56) References Cited

U.S. PATENT DOCUMENTS 4,216,251 A 8/1980 Nishimura et al.
2009/0246475 A1* 10/2009 Hirata ..................... B32B 27/18
428/172

FOREIGN PATENT DOCUMENTS

JP S59146602 8/1984
JP 2001259264 9/2001
(Continued)

OTHER PUBLICATIONS

Matsuda et al. (JP 2013132783(A) machine translation)—Jul. 8, 2013.*

(Continued)

*Primary Examiner* — Lawrence D Ferguson
(74) *Attorney, Agent, or Firm* — Grüneberg and Myers PLLC

(57) ABSTRACT

A decorative molding sheet including: an artificial leather substrate that includes a non-woven fabric containing ultra-fine fibers with an average fineness of 0.001 to 1 dtex and an elastic polymer applied in the non-woven fabric, and that has a leather-like finished surface; and a resin layer that is formed on a back surface of the artificial leather substrate relative to the leather-like finished surface, and that contains a vinyl chloride-vinyl acetate copolymer, and a preform molded body obtained by shaping the decorative molding sheet into a three-dimensional shape are used.

17 Claims, 3 Drawing Sheets

(51) Int. Cl.
  *B32B 5/02* (2006.01)
  *B32B 27/30* (2006.01)
  *D06N 3/14* (2006.01)
  B29C 45/14 (2006.01)
  B29K 55/02 (2006.01)
  B29K 627/06 (2006.01)
  B29K 631/00 (2006.01)

(52) U.S. Cl.
  CPC .......... *D06N 3/14* (2013.01); *B29C 45/14336* (2013.01); *B29K 2055/02* (2013.01); *B29K 2627/06* (2013.01); *B29K 2631/04* (2013.01); *B32B 2262/0261* (2013.01); *B32B 2419/00* (2013.01); *B32B 2451/00* (2013.01); *B32B 2457/00* (2013.01); *B32B 2479/00* (2013.01); *B32B 2605/003* (2013.01); *B32B 2605/18* (2013.01)

(58) Field of Classification Search
  CPC ........ B32B 2262/0261; B32B 2419/00; B32B 2451/00; B32B 2457/00; B32B 2479/00; B32B 2605/003; B32B 2605/18; B32B 27/00; B32B 27/12; B32B 27/28; B32B 27/306; B32B 27/34; B32B 27/40; B32B 5/02; B32B 5/022; D06N 3/14
  See application file for complete search history.

(56) References Cited

FOREIGN PATENT DOCUMENTS

| JP | 2007-276366 | 10/2007 |
|---|---|---|
| JP | 2013-132783 | 7/2013 |
| JP | 2014-181414 | 9/2014 |
| JP | 2017-133000 | 8/2017 |

OTHER PUBLICATIONS

International Search Report dated Mar. 19, 2019 in PCT/JP2018/046734 with English translation, 5 pages.
Written Opinion dated Mar. 19, 2019 in PCT/JP2018/046734.
Extended European Search Report dated Oct. 14, 2021 in European Application 18900271.0, 6 pages.

* cited by examiner

DECORATIVE MOLDING SHEET, PREFORM MOLDING BODY, AND DECORATIVE MOLDED BODY

TECHNICAL FIELD

The present invention relates to a decorative molding sheet for providing the surface of a resin molded body with a leather-like external appearance, a preform molded body obtained by shaping the same, and a decorative molded body.

BACKGROUND ART

Decorative molding sheets are known that are used for decorating the surface of a resin molded body as a casing of a mobile phone, a mobile device or a home electrical appliance, an interior part of a vehicle, an aircraft or the like, or an exterior member of a building material, an article of furniture or the like by vacuum molding, pressure molding, hot-press molding, in-molding (also referred to as insert molding) or the like.

For example, PTL 1 listed below discloses that a non-woven fabric having a back surface onto which a vinyl chloride-vinyl acetate copolymer is applied is preform molded, and a decorative molded body is produced by injecting polycarbonate by in-molding using the resulting preform molded body. In addition, PTL 2 listed below discloses that an ultrafine fiber non-woven fabric having a back surface onto which vinyl chloride is applied is preform molded, and a decorative molded body is produced by in-molding using the resulting preform molded body.

CITATION LIST

Patent Literatures

[PTL 1] Japanese Laid-Open Patent Publication No. 2007-276366
[PTL 2] Japanese Laid-Open Patent Publication No. 2013-132783

SUMMARY OF INVENTION

Technical Problem

As described above, a decorative molded body is conventionally known in which a preform molded body, which is obtained by preforming a sheet including a non-woven fabric, is used for in-molding and integrated with the surface of a resin molded body. However, a conventional preform molded body, which is obtained by preforming a sheet including a non-woven fabric, has poor shaping properties when producing a preform molded body, is difficult to accurately retain its shape after preform molding, and hence has low shape stability. Therefore, when housed in a mold used for in-molding, the preform molded body may not accurately conform to the shape of the cavity of the in-molding mold. In that case, the preform molded body may be integrated with a resin molded body that is molded by in-molding, at a position displaced from the intended region, resulting in the problem of low positional accuracy.

Further, when a molten resin used when molding the resin molded body by in-molding comes into contact with the preform molded body, the flowing molten resin applies shearing force to the surface of the preform molded body, whereby the force is applied in a direction in which the preform molded body is shrunk, for example, at a portion of the resin molded body where a weld line is formed, resulting in the problem of formation of creases. Furthermore, there is also the problem of insufficient adhesion of the preform molded body to the resin molded body.

It is an object of the present invention to provide a decorative molding sheet that has solved the above-described problems relating to the shape stability after preform molding, the positional accuracy of the preform molded body relative to the resin molded body, and the adhesion of the preform molded body to the resin molded body in the case of producing a decorative molded body in which a preform molded body, which is obtained by preforming a sheet including a non-woven fabric, is used for in-molding and integrated with the surface of the resin molded body, a preform molded body obtained by shaping the decorative molding sheet, and a decorative molded body.

Solution to Problem

An aspect of the present invention is directed to a decorative molding sheet including: an artificial leather substrate that includes a non-woven fabric containing ultrafine fibers with an average fineness of 0.001 to 1 dtex and an elastic polymer applied in the non-woven fabric, and that has a leather-like finished surface; and a resin layer that is formed on a back surface of the artificial leather substrate relative to the leather-like finished surface, and that contains a vinyl chloride-vinyl acetate copolymer. Such a decorative molding sheet is excellent in preform moldability and the shape stability after preform molding. Additionally, when the decorative molding sheet is preform molded and used for in-molding, the preform molded body is excellent in the positional accuracy relative to the resin molded body and the adhesion to the resin molded body.

It is preferable that a vinyl acetate unit content in the vinyl chloride-vinyl acetate copolymer is 5 to 25 mol %, because this provides an excellent shape stability when the decorative molding sheet is preform molded and an excellent balance between the positional accuracy and the adhesion of the preform molded body when a decorative molded body is molded.

It is preferable that the vinyl chloride-vinyl acetate copolymer has a glass transition temperature of 65 to 85° C., because this provides an excellent shape stability when the decorative molding sheet is preform molded, and an excellent balance between the positional accuracy and the adhesion of the preform molded body when a decorative molded body is molded.

It is preferable that the resin layer has a basis weight of 50 to 100 g/m$^2$, because this provides an excellent shape stability and an excellent balance between the positional accuracy and the adhesion of the preform molded body.

It is preferable that the artificial leather substrate contains 10 to 40 mass % of the elastic polymer, because this provides a particularly excellent shape stability when a preform molded body is produced.

It is preferable that the elastic polymer is polyurethane, because this provides excellent shaping properties and shape stability of the preform molded body, and maintains an excellent leather-like texture.

It is preferable that the leather-like finished surface is a napped surface formed by napping the ultrafine fibers, or a resin layer stacked on a surface of the artificial leather substrate, because a leather-like external appearance can be achieved.

It is preferable that the ultrafine fibers include nylon ultrafine fibers, because this provides an excellent shape stability when a preform molded body is produced. A non-woven fabric containing nylon ultrafine fibers is preferable because of its soft texture, but has a poor shape stability when preform molding is performed, and is difficult to be shaped. According to the present invention, it is possible to obtain a preform molded body with an excellent shape stability even in the case of using an artificial leather substrate including a non-woven fabric containing nylon ultrafine fibers.

Another aspect of the present invention is directed to a preform molded body obtained by shaping the above-described decorative molding sheet into a three-dimensional shape. Such a preform molded body is preferable in that it has an excellent shape stability, and is therefore less likely to cause positional displacement when being in-molded, and also has an excellent adhesion to the resin molded body that is injection molded.

Another aspect of the present invention is directed to a decorative molded body including: a resin molded body; and a skin layer disposed on a surface of the resin molded body, wherein the skin layer is the above-described decorative molding sheet.

Advantageous Effects of Invention

A decorative molding sheet that provides, in the case of preform molding a decorative molding sheet including an artificial leather substrate and in-molding the preform molded body, an excellent shape stability of the preform molded body, an excellent positional accuracy of the preform molded body relative to a resin molded body, and an excellent adhesion of the preform molded body to the resin molded body, a preform molded body obtained by shaping the decorative molding sheet, and a decorative molded body can be obtained.

DESCRIPTION OF EMBODIMENT

Hereinafter, a preferred embodiment of a decorative molding sheet according to the present invention, a preform molded body obtained by shaping the decorative molding sheet, and a decorative molded body will be described.

Figure 1:
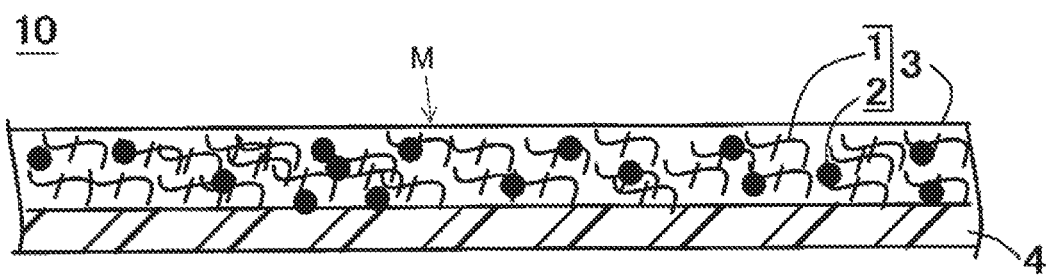
FIG. 1 is a schematic cross-sectional view of a decorative molding sheet according to an embodiment.

FIG. 1 is a schematic cross-sectional view of a decorative molding sheet 10 according to the present embodiment. In FIG. 1, reference numeral 1 denotes a non-woven fabric containing ultrafine fibers, reference numeral 2 denotes an elastic polymer applied in the non-woven fabric, reference numeral 3 denotes an artificial leather substrate having a leather-like finished surface M, and reference numeral 4 denotes a resin layer that is formed on a back surface of the artificial leather substrate 3 relative to the leather-like finished surface M, and that contains a vinyl chloride-vinyl acetate copolymer. A suede-like or nubuck-like napped surface obtained by napping the fibers of the non-woven fabric 1 is formed as the leather-like finished surface M, or the leather-like finished surface M is provided as a finish such that a leather grain-finished resin layer is stacked on the non-woven fabric 1.

As for the fineness of the ultrafine fibers that form the non-woven fabric of the artificial leather substrate, the average fineness is preferably 0.001 to 1 dtex, more preferably 0.002 to 0.8 dtex, particularly preferably 0.003 to 0.5 dtex, because an excellent stretchability during molding is provided.

The resin that forms the ultrafine fibers is not particularly limited as long as it has thermal softening properties during molding. Specific examples of such a resin include polyesters such as polyethylene terephthalate (PET), a modified polyethylene terephthalate (modified PET), and polybutylene terephthalate; nylons such as nylon 6, nylon 6•6, nylon 6•10, and nylon 6•12; and polyolefins such as polypropylene and polyethylene. Among these, nylons are preferable because a soft texture is provided.

As the elastic polymer applied in the non-woven fabric, any elastic polymer that has been conventionally impregnated into an artificial leather substrate can be used without any particular limitation. As specific examples of such an elastic polymer, it is preferable to use, for example, polyurethane or an acryl-based elastic body, because they provide excellent shaping properties and shape stability of the preform molded body, and maintain a leather-like texture.

The content of the elastic polymer applied in the non-woven fabric is preferably 1 to 50 mass %, more preferably 5 to 45 mass %, particularly preferably 10 to 40 mass %, because a particularly excellent shape stability of the preform molded body is provided. When the content of the elastic polymer is too low, it is difficult to maintain the shape when producing a preform molded body. In particular, in the case of using a non-woven fabric of nylon fibers, it tends to be difficult to retain the shape after preform molding. When the elastic polymer content is too high, the shaping properties during preform molding and the moldability during in-molding tend to be reduced.

A suede-like or nubuck-like napped surface obtained by napping the fibers of the non-woven fabric is formed as the leather-like finished surface M located on the side of the artificial leather substrate that will constitute the surface of the decorative molded body, or the leather-like finished surface M is provided with a finish resembling a leather surface such that a leather grain-finished resin layer is stacked on the non-woven fabric. A napped artificial leather is obtained when a napped surface is formed on the leather-like finished surface M of the artificial leather substrate, and a grain-finished artificial leather is obtained when a grain-finished resin layer is stacked on the leather-like finished surface M. Examples of the method for forming the napped artificial leather include a method in which the surface of an artificial leather substrate is finished into a suede-like or nubuck-like surface by buffing the surface. Buffing is a treatment in which the surface of the artificial leather substrate is rubbed using sandpaper, a brush, or the like so as to nap the fibers. Examples of the method for forming the grain-finished artificial leather include a method in which a grain-finished resin layer containing an elastic polymer such as polyurethane is stacked on the surface of an artificial leather substrate by a method such as dry forming or direct coating. As the elastic polymer that forms the grain-finished resin layer, it is possible to use polyurethane and an acrylic elastic body that have been conventionally used for formation of a grain-finished resin layer.

Also, a resin layer containing a vinyl chloride-vinyl acetate copolymer is formed on the back surface of the decorative molding sheet relative to the leather-like finished surface.

The vinyl acetate unit content in the vinyl chloride-vinyl acetate copolymer is preferably 5 to 25 mol %, more preferably 8 to 20 mol-, because of the excellent shape stability when the decorative molding sheet is preform molded, and the excellent balance between the positional accuracy and the adhesion of the preform molded body when a decorative molded body is molded. When the vinyl acetate unit content is too high, it tends to be difficult to improve the shape stability of the preform molded body, and the positional accuracy and the smoothness near the weld line of the preform molded body. When the content of the vinyl acetate alone is too low, it tends to be difficult to improve the adhesion of the preform molded body to the resin molded body. Note that the vinyl acetate unit content in the vinyl chloride-vinyl acetate copolymer can be measured using FT-IR, for example.

The glass transition temperature (° C.) of the vinyl chloride-vinyl acetate copolymer is preferably 50 to 95° C., more preferably 65 to 85° C., particularly preferably 68 to 76° C. When the glass transition temperature is too low, it tends to be difficult to improve the shape stability of the preform molded body, and the positional accuracy, the adhesion, and the smoothness near the weld line of the preform molded body. When the glass transition temperature is too high, it tends to be difficult to improve the adhesion between the preform molded body and the resin molded body.

The amount (resin basis weight) of the resin layer containing a vinyl chloride-vinyl acetate copolymer, per unit area of the surface on which the resin layer is formed is preferably 25 to 200 $g/m^2$, particularly preferably 50 to 100 $g/m^2$. When the resin basis weight is too small, it tends to be difficult to improve the shape stability and the smoothness near the weld line of the preform molded body when a decorative molded body is formed. In particular, in the case of using a non-woven fabric of nylon fibers having a soft texture, it tends to be difficult to improve the shape stability.

The resin layer containing a vinyl chloride-vinyl acetate copolymer is formed by applying an emulsion or solution of a vinyl chloride-vinyl acetate copolymer to a back surface of the decorative molding sheet relative to the leather-like finished surface, followed by drying.

Next, with reference to the drawings, as a production method of the decorative molded body of the present embodiment, a production method using in-molding will be described in which a preform molded body obtained by preforming a decorative molding sheet into a shape conforming to a cavity of a mold used for injection molding is produced, and thereafter the preform molded body is housed in the cavity of the mold and then injection-molded.

Figure 2:
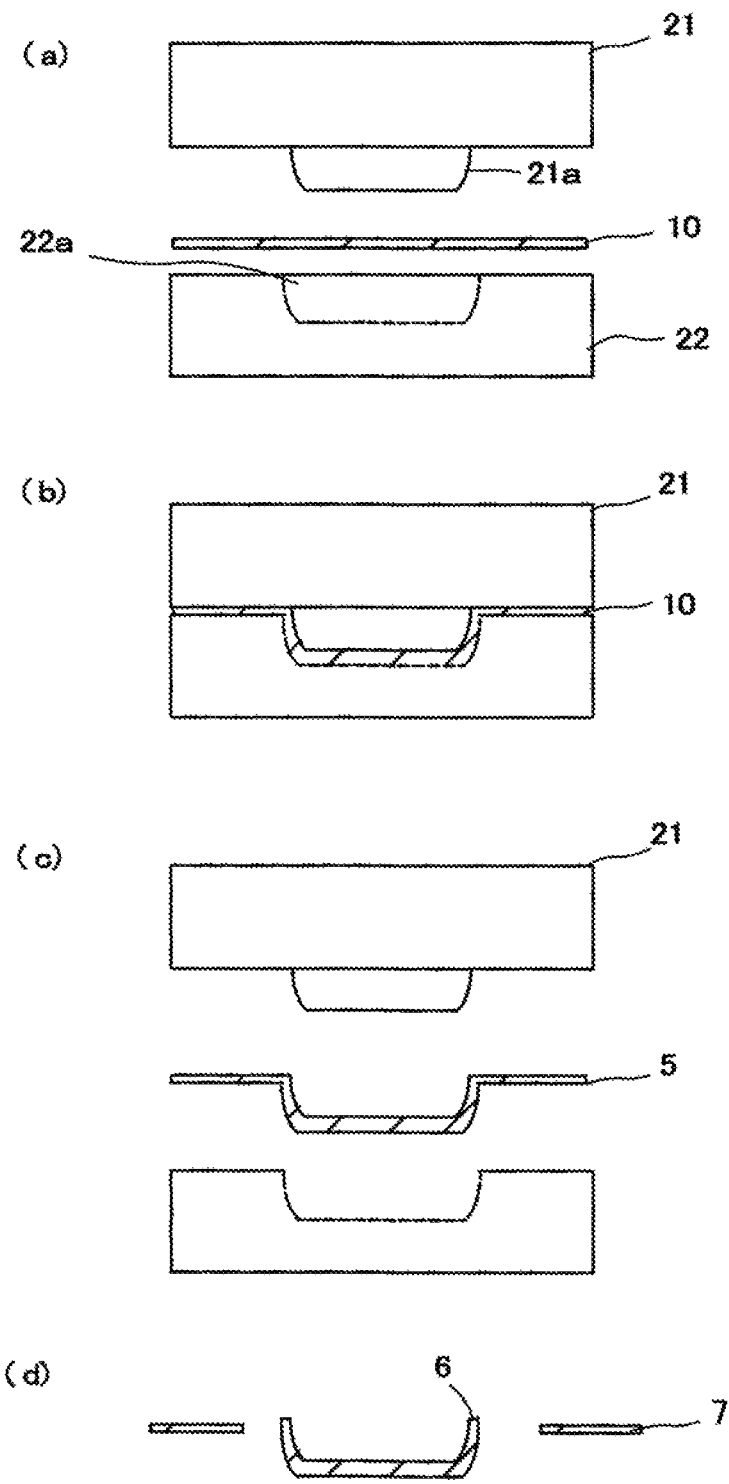
FIG. 2 shows explanatory diagrams illustrating steps of preform molding the decorative molding sheet.

FIG. 2 shows explanatory diagrams for illustrating steps of hot press molding for molding a preform molded body of a decorative molding sheet. In FIG. 2, reference numeral 10 denotes a decorative molding sheet, reference numeral 21 denotes a male mold for hot pressing, reference numeral 22 denotes a female mold for hot pressing, reference numeral 21a denotes a core of the male mold 21, and reference numeral 22a denotes a cavity of the female mold 22. In addition, reference numeral 5 denotes a preform molded body before being trimmed, reference numeral 6 denotes a preform molded body, and reference numeral 7 denotes an unnecessary portion of the trimmed decorative molding sheet 10.

First, as shown in FIG. 2(a), the decorative molding sheet 10 is disposed between the female mold 22 and the male mold 21. At this time, the female mold 22 and the male mold 21 are heated to a predetermined temperature for softening the decorative molding sheet 10. Then, as shown in FIG. 2(b), the female mold 22 and the male mold 21 are clamped together under a predetermined pressure. At this time, the decorative molding sheet 10 is shaped by being sandwiched between the core 21a of the male mold 21 and the cavity 22a of the female mold 22.

Then, as shown in FIG. 2(c), the female mold 22 and the male mold 21 are opened, and then cooled, whereby a preform molded body 5 before being trimmed is obtained. Then, the preform molded body 5 before being trimmed is removed from the female mold 22 and the male mold 21, and the unnecessary portion 7 of the decorative molding sheet 10 is trimmed, whereby a preform molded body 6 is obtained.

Although an example in which the preform molded body is molded by hot press molding is representatively described in the present embodiment, the method for molding the preform molded body is not limited to hot press molding. Any molding method that allows a sheet to be shaped into a three-dimensional shape, such as vacuum molding, pressure molding, or vacuum pressure molding, can be used without any particular limitation.

Figure 3:
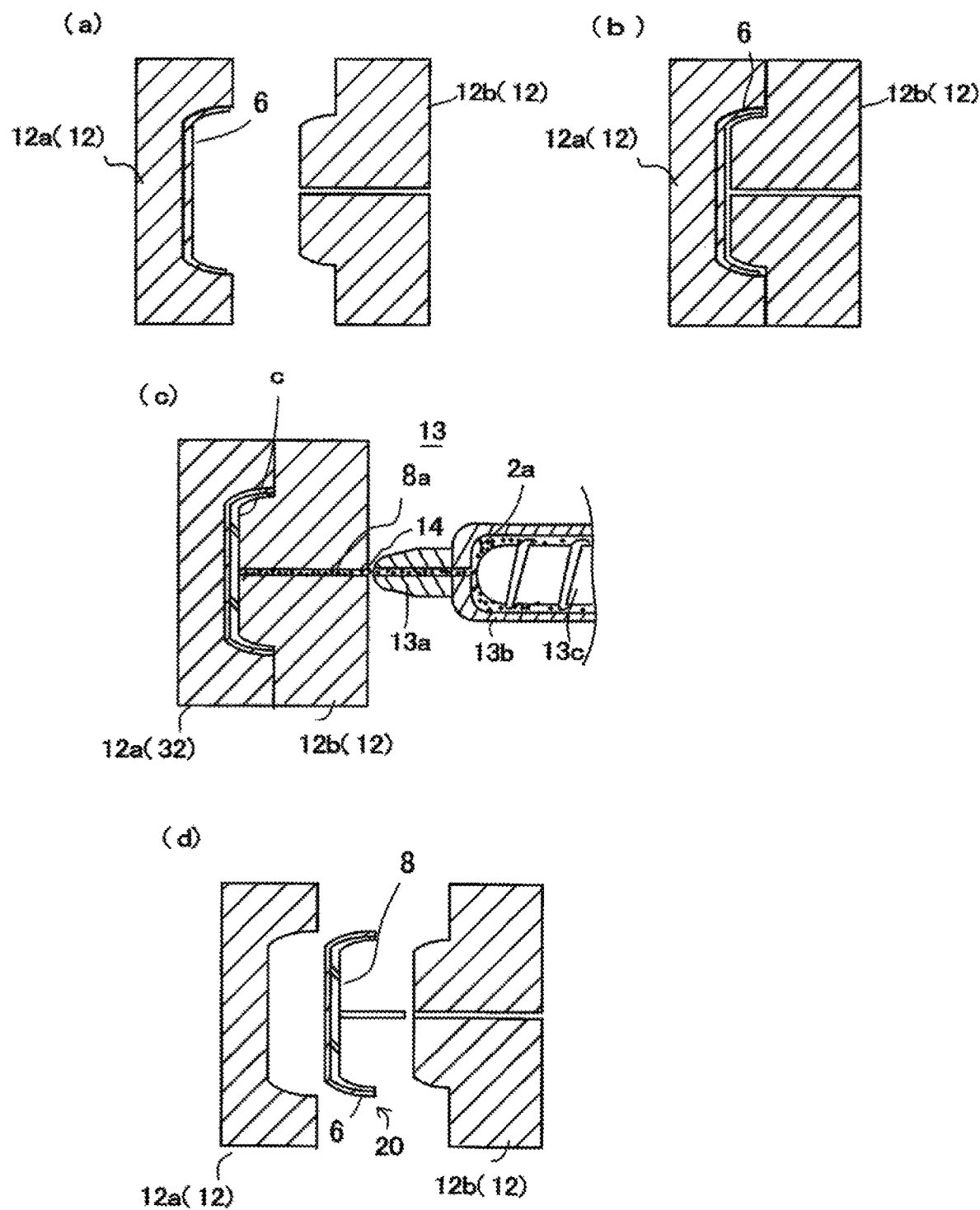
FIG. 3 shows explanatory diagrams illustrating steps of performing in-molding using preform molding.

A preform molded body obtained in this manner is used for in-molding and integrated with the surface of the resin molded body, to form a decorative molded body. With reference to FIG. 3, a description will be given of a method for producing, using in-molding, a decorative molded body 20 obtained by integrating a preform molded body 6 with a resin molded body 8 that is injection-molded.

In FIG. 3, reference numeral 6 denotes a preform molded body, reference numeral 12a denotes a movable mold, reference numeral 12b denotes a fixed mold, reference numeral 13 denotes a body of an injection portion of an injection molding machine, reference numeral 13a denotes a nozzle, reference numeral 13b denotes a cylinder, reference numeral 13c denotes an in-line screw, reference numeral 14 denotes a resin flow inlet, reference numeral 8 denotes a resin molded body, reference numeral 8a denotes a molten resin, and reference numeral 20 denotes a decorative molded body. The movable mold 12a and the fixed mold 12b, as a pair, constitute an injection molding mold 12 that forms the cavity c. Note that, in the present embodiment, the movable mold 12a is a female mold of the injection molding mold, and the fixed mold 12b is a male mold of the injection molding mold.

First, as shown in FIG. 3(a), the preform molded body 6 is housed in a recess for forming the cavity of the movable mold 12a.

Next, as shown in FIG. 3(b), the movable mold 12a and the fixed mold 12b are clamped together. Then, as shown in FIG. 3(c), the cavity c formed in a state in which the movable mold 12a and the fixed mold 12b are clamped together is filled with the molten resin 8a. More specifically, the injection portion 13 of the injection molding machine is moved forward so as to bring the nozzle 13a into contact against the resin flow inlet 14 formed in the fixed mold 12b, and the molten resin 8a is injected inside the cylinder 13b by using the in-line screw 13c, whereby the cavity c is filled with the molten resin 8a under a predetermined filling pressure.

The injection molding conditions may be appropriately set to appropriate conditions (resin temperature, mold temperature, injection pressure, injection speed, holding pressure after injection, cooling time) according to the thermal properties or melt viscosity of the resin to be injected, the shape of the resin molded body, and the resin thickness.

The type of the resin of the injection-molded body that is molded is not particularly limited. Specific examples thereof include acryl-based resins such as an ABS resin and a PMMA resin, polystyrene-based resins, polyolefins such as polypropylene, polycarbonate, polyesters such as polyethylene terephthalate (PET) and polybutylene terephthalate (PBT), various nylons, and COP resins.

The thickness of the injection-molded body that is molded is not also particularly limited, and may be selected as appropriate according to the usage and the moldability. For example, for use in casings of home electrical appliances, a thickness range of preferably 0.3 to 2 mm, more preferably 0.5 to 1.5 mm is selected as a preferable range.

Then, in a cooling step, a stack in which the resin molded body 8 that has been molded in the cavity c formed in a state in which the movable mold 12a and the fixed mold 12b are clamped together and the preform molded body 6 stacked on the resin molded body 8 are integrated with each other is cooled for a predetermined time. Thereafter, as shown in FIG. 3(d), the movable mold 12a and the fixed mold 12b are opened, and a decorative molded body 20 in which the resin molded body 8 that has been molded and the preform molded body 6 of the decorative molding sheet that is stacked on the resin molded body 8 are integrated with each other is took out.

EXAMPLES

Next, the present invention will be described more specifically by way of examples. It should be appreciated that the scope of the present invention is by no means limited by the examples.

Example 1

Fifty parts by mass of 6-nylon (Ny) (island component) and 50 parts by mass of a high-fluidity, low-density polyethylene (sea component) were chip-blended, and then mixed and melt-spun, thus producing island-in-the-sea composite fibers. Then, the island-in-the-sea composite fibers were stretched 2.5 times in hot water at 70° C., and a fiber oil agent was applied to the stretched island-in-the-sea composite fibers, which were then mechanically crimped, and further dried, followed by cutting into 51 mm, to obtain staple fibers with 4 dtex. A web with a basis weight of 600 g/m² was formed using the staple fibers. Subsequently, both surfaces of the web were needle-punched alternately at a total density of about 500 punches/cm², further heated to 120° C., and pressed with a calendar roll, thus forming an entangled non-woven fabric with a smooth surface. The entangled non-woven fabric was impregnated with a polytetramethylene ether-based polyurethane dimethylformamide solution (concentration: 13%), and immersed in a liquid mixture of DMF/water=15/85, to solidify the polyurethane into a porous form by wet solidification. Thereafter, the sea component of the island-in-the-sea composite fibers was removed by dissolution in hot toluene, thus generating ultrafine fibers with a fineness of 0.004 dtex. In this manner, an artificial leather substrate with a thickness of 1.4 mm was obtained.

The artificial leather substrate with a thickness of 1.4 mm was cut in half, and the sliced surface was buffed so as to adjust the thickness. Furthermore, the surface opposite to the sliced surface was buffed so as to form a suede-like napped surface, thus obtaining a suede-like artificial leather with a polyurethane content of 40 mass %, a basis weight of 221 g/m², an apparent density of 0.368 g/cm³, and a thickness of 0.60 mm.

Then, an emulsion of a vinyl chloride-vinyl acetate copolymer having the copolymerization ratio and the properties shown in Table 1 was gravure coated to the back surface of the suede-like artificial leather relative to the suede-like napped surface, and dried, thus forming a resin layer of the vinyl chloride-vinyl acetate copolymer with a resin basis weight of 99 g/m². In this manner, a decorative molding sheet including a suede-like artificial leather that included a non-woven fabric containing ultrafine fibers with an average fineness of 0.004 dtex and 40 mass % of the polyurethane, and the resin layer that was formed on the back surface relative to the napped surface, and that contained the vinyl chloride-vinyl acetate copolymer was obtained. The obtained decorative molding sheet had a basis weight of 320 g/m, an apparent density of 0.516 g/cm³, and a thickness of 0.62 mm.

Then, the decorative molding sheet was subjected to hot press molding using a press mold for shaping the decorative molding sheet into a shape corresponding to an injection molding mold, which will be described below, at a mold temperature of 100° C. and a pressing pressure of 100 kg/cm², thus molding a preform molded body. Then, the shape stability of the preform molded body was evaluated according to the following criteria.
(Shape Stability)

The height retention of the obtained preform molded body was calculated, and the external appearance was visually checked. Then, evaluation was made according to the following criteria:

A: The height retention was 951 or more, and the corners were shaped favorably.

B: The height retention was 90 to 95%, and the corners were shaped favorably.

C: The height retention was 80 to 90%, and the corners were shaped slightly unclearly.

D: The height retention was 50 to 80%, and the corners were shaped unclearly.

E: The height retention was 0 to 50%, and only corner-shaping marks were left.

Next, in-molding was performed using the obtained preform molded body. Specifically, in a state in which the movable mold and the fixed mold of the injection molding mold mounted on an electric injection molding machine (SE-100 manufactured by Sumitomo Heavy Industries, Ltd.) were opened, the preform molded body was disposed in a recess forming the cavity of the movable mold. Then, the movable mold and the fixed mold were clamped together. Note that the injection molding mold was a two-gate mold in which a weld line is formed at the center, and the cavity thereof had the shape of a box of 1.6 mm in thickness, 100 mm in length, 150 mm in width, and 5.0 mm in height, with one surface opened.

Then, an ABS resin was injected under the conditions of a resin temperature of 230° C. and a mold temperature of 40° C., thus filling the inside of the cavity. Then, after filling of the cavity, the molds were cooled, and thereafter opened. In this manner, a decorative molded body in which the preform molded body was integrated with the surface of the resin molded body of the ABS resin was obtained.

Then, for the obtained decorative molded body, the positional accuracy of the preform molded body relative to the resin molded body, the smoothness of the surface of the preform molded body near the weld line, and the adhesion of the preform molded body to the resin molded body were evaluated according to the following criteria.

(Positional Accuracy of Preform Molded Body Relative to Resin Molded Body)

The positional displacement between the preform molded body and the resin molded body of the decorative molded body was visually observed, and was evaluated according to the following criteria:

A: The preform molded body was accurately disposed relative to the intended region of the resin molded body within a displacement of 0.2 mm.

B: The preform molded body was positionally displaced relative to the intended region of the resin molded body by 0.2 to 0.5 mm.

C: The preform molded body was positionally displaced relative to the intended region of the resin molded body by more than 0.5 mm.

(Smoothness Near Weld Line)

The portion of the surface of the preform molded body of the decorative molded body near the location where the weld line of the resin molded body was formed was visually checked, and was evaluated according to the following criteria:

A: The surface of the preform molded body was smooth, and there was no weld line mark at all.

B: The surface of the preform molded body was smooth, but a weld line mark of 1 cm or less was confirmed.

C: The surface of the preform molded body was not smooth, and a weld line mark of 1 cm or more was confirmed.

(Adhesion of Preform Molded Body to Resin Molded Body)

The adhesion strength of the preform molded body to the resin molded body in the decorative molded body was evaluated as follows, using a tensile tester (Tensilon ORIENTEC CORPORATION). Specifically, a test piece was formed by cutting the decorative molded body into a width of 25 mm×a length of 100 mm. Then, the resin molded body and the preform molded body of the decorative molded body of the test piece were separated so as to be delaminated by a length of about 40 mm from an end. Then, their respective ends were respectively clamped by upper and lower chucks of the tensile tester with an initial interval set to 50 mm, and were subjected to a tensile test at a tensile speed of 100 mm/min, to obtain a tensile time-peel strength curve. Then, five maximum values and five minimum values were extracted from the obtained curve, and an average value thereof was determined as the adhesion strength. Average values were determined for three samples, and were classified as follows:

A: 4 Kg/cm or more
B: 3 to 4 Kg/cm
C: 2 to 3 Kg/cm
D: 1 to 2 Kg/cm
E: 0 to 1 Kg/cm The results are shown in Table 1.

TABLE 1

| | Example No. | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Spinning condition | Mixed | Mixed | Mixed | Mixed | Mixed | Composite | Mixed | Mixed |
| Type of ultrafine fibers | Ny | Ny | Ny | Ny | Ny | Ny | Ny | Ny |
| Polyurethane content (mass %) | 40 | 40 | 40 | 40 | 40 | 40 | 40 | 40 |
| Surface finishing | Suede-like | Suede-like | Suede-like | Suede-like | Grain-finished | Suede-like | Suede-like | Suede-like |
| Vinyl chloride/vinyl acetate copolymerization ratio (%) | 92/8 | 82/13 | 87/13 | 79/21 | 87/13 | 92/3 | 98/2 | 50/50 |
| Glass transition temperature of vinyl chloride-vinyl acetate copolymer (° C.) | 76 | 70 | 70 | 68 | 70 | 76 | 80 | 57 |
| Resin basis weight of vinyl chloride-vinyl acetate copolymer (g/ml) | 99 | 94 | 51 | 91 | 95 | 100 | 97 | 98 |
| Basis weight (g/m$^2$) | 320 | 315 | 272 | 312 | 298 | 340 | 318 | 312 |
| Thickness (mm) | 0.62 | 0.61 | 0.60 | 0.61 | 0.40 | 0.62 | 0.61 | 0.60 |
| Apparent density (g/cm$^3$) | 0.516 | 0.516 | 0.453 | 0.511 | 0.745 | 0.548 | 0.521 | 0.520 |
| Shape stability | B | B | B | A | B | B | B | C |
| Positional accuracy of preform molded body | A | A | A | A | A | A | A | B |
| Smoothness near weld line | A | B | C | A | B | B | A | B |
| Adhesion of preform molded body to resin molded body | B | A | B | A | A | A | C | A |

| | Example No. | | | | | | |
|---|---|---|---|---|---|---|---|
| | Ex. 9 | Ex. 10 | Com. Ex. 1 | Com. Ex. 2 | Com. Ex. 3 | Com. Ex. 4 | Com. Ex. 5 |
| Spinning condition | Mixed | Mixed | Mixed | Mixed | Mixed | Mixed | Composite |
| Type of ultrafine fibers | Ny | Ny | Ny | Ny | Ny | Ny | Ny |
| Polyurethane content (mass %) | 40 | 40 | 40 | 40 | 40 | 40 | 0 |
| Surface finishing | Suede-like | Suede-like | Suede-like | Suede-like | Grain-finished | Grain-finished | Suede-like |
| Vinyl chloride/vinyl acetate copolymerization ratio (%) | 92/8 | 92/8 | None | 0/100 | None | 100/0 | 92/8 |

TABLE 1-continued

| | | | | | | | |
|---|---|---|---|---|---|---|---|
| Glass transition temperature of vinyl chloride-vinyl acetate copolymer (° C.) | 76 | 76 | — | — | — | — | 76 |
| Resin basis weight of vinyl chloride-vinyl acetate copolymer (g/ml) | 202 | 21 | — | 97 | — | 99 | 100 |
| Basis weight (g/m²) | 404 | 238 | 221 | 318 | 203 | 302 | 233 |
| Thickness (mm) | 0.68 | 0.60 | 0.60 | 0.62 | 0.38 | 0.40 | 0.55 |
| Apparent density (g/cm³) | 0.594 | 0.397 | 0.368 | 0.513 | 0.534 | 0.755 | 0.424 |
| Shape stability | B | C | B | D | E | C | C |
| Positional accuracy of preform molded body | C | A | C | B | C | B | A |
| Smoothness near weld line | A | C | C | C | C | B | C |
| Adhesion of preform molded body to resin molded body | B | B | E | C | E | D | C |

Examples 2 to 4

Decorative molding sheets and decorative molded bodies were produced and evaluated in the same manner as in Example 1 except that the copolymerization ratio of the vinyl chloride-vinyl acetate copolymer or the resin basis weight in the resin layer of the vinyl chloride-vinyl acetate copolymer was changed as shown in Table 1. The results are shown in Table 1.

Example 5

The artificial leather substrate obtained in Example 1 was cut in half, and the sliced surface was buffed so as to adjust the thickness, and thereafter a grain-finished resin layer of polyurethane was bonded by dry forming to the napped surface formed by buffing the surface opposite to the sliced surface, thus obtaining a grain-finished artificial leather. A decorative molding sheet and a decorative molded body were produced and evaluated in the same manner as in Example 1 except that the grain-finished artificial leather was used in place of the suede-like artificial leather in Example 1. The results are shown in Table 1.

Example 6

Island-in-the-sea composite fibers composed of 60 parts by mass of nylon 6•12 (Ny 6•12) (island component) and 40 parts by mass of a high-fluidity, low-density polyethylene (sea component) were prepared by melt spinning. Then, the island-in-the-sea composite fibers were stretched 2.5 times in hot water at 70° C., and a fiber oil agent was applied to the stretched island-in-the-sea composite fibers, which were then mechanically crimped, and further dried, followed by cutting into 51 mm, thus obtaining staple fibers with 4 dtex. A web with a basis weight of 600 g/m² was formed using the staple fibers. Subsequently, both surfaces of the web were needle-punched alternately at a total density of about 1500 punches/cm², to attain an area shrinkage of 20%. Furthermore, the web was heated to 120° C., and pressed with a calendar roll, thus forming an entangled non-woven fabric with a smooth surface. The entangled non-woven fabric was impregnated with a polytetramethylene ether-based polyurethane dimethylformamide solution (concentration: 13%), and the sea component of the island-in-the-sea composite fibers was removed by dissolution in hot toluene, thus generating ultrafine fibers with a fineness of 0.004 dtex. In this manner, an artificial leather substrate with a thickness of 1.4 mm was obtained. A decorative molding sheet and a decorative molded body were produced and evaluated in the same manner as in Example 1 except that the artificial leather substrate was used. The results are shown in Table 1.

Examples 7 to 10

Decorative molding sheets and decorative molded bodies were produced and evaluated in the same manner as in Example 1 except that the copolymerization ratio of the vinyl chloride-vinyl acetate copolymer or the resin basis weight in the resin layer of the vinyl chloride-vinyl acetate copolymer was changed as shown in Table 1. The results are shown in Table 1.

Comparative Example 1

A decorative molding sheet and a decorative molded body were produced and evaluated in the same manner as in Example 1 except that the resin layer of the vinyl chloride-vinyl acetate copolymer was not formed. The results are shown in Table 1.

Comparative Example 2

A decorative molding sheet and a decorative molded body were produced and evaluated in the same manner as in Example 1 except that a resin layer of a vinyl acetate homopolymer was formed in place of the resin layer of the vinyl chloride-vinyl acetate copolymer. The results are shown in Table 1.

Comparative Example 3

A decorative molding sheet and a decorative molded body were produced and evaluated in the same manner as in Example 5 except that the resin layer of the vinyl chloride-vinyl acetate copolymer was not formed. The results are shown in Table 1.

Comparative Example 4

A decorative molding sheet and a decorative molded body were produced and evaluated in the same manner as in Example 5 except that a resin layer of a vinyl chloride homopolymer was formed in place of the resin layer of the vinyl chloride-vinyl acetate copolymer. The results are shown in Table 1.

Comparative Example 5

A decorative molding sheet and a decorative molded body were produced and evaluated in the same manner as in Example 1 except that the step of impregnating polyurethane was omitted in the production of the artificial leather substrate of Example 6. The results are shown in Table 1.

As shown in Table 1, in the case of using, as the decorative molding sheets, the artificial leather substrates of Examples 1 to 10, which included the non-woven fabrics of nylon ultrafine fibers, the shape stability was C or above for all of the preform molded bodies. On the other hand, in the case of Comparative Examples 1 and 3, in which the resin layer of the vinyl chloride-vinyl acetate copolymer was not formed, the shape stability of the preform molded body was E. In the case of Comparative Example 2, in which the resin layer of a vinyl acetate homopolymer was formed in place of the resin layer of the vinyl chloride-vinyl acetate copolymer, the shape stability was D. In the case of Comparative Example 4, in which the resin layer of a vinyl chloride homopolymer was formed in place of the resin layer of the vinyl chloride-vinyl acetate copolymer, the shape stability was C, but the adhesion was D. Similarly, in the case of Comparative Example 5, in which the decorative molding sheet in which the non-woven fabric was not impregnated with polyurethane was used, the shape stability was C, but the smoothness near the weld line and the adhesion were C.

Example 11

An entangled non-woven fabric of island-in-the-sea composite fibers that contained an ethylene-modified polyvinyl alcohol as a thermoplastic resin serving as a sea component and a modified PET (isophthalic acid-modified polyethylene terephthalate with an isophthalic acid unit content of 6.0 mol %) as a thermoplastic resin serving as an island component was produced. Then, the entangled non-woven fabric of the island-in-the-sea composite fibers was impregnated with an emulsion of polycarbonate/ether polyurethane, and thereafter heat-dried, thus obtaining an entangled non-woven fabric of the island-in-the-sea composite fibers impregnated with polyurethane.

Then, the entangled non-woven fabric of the island-in-the-sea composite fibers impregnated with polyurethane was immersed in hot water at 90° C. for 20 minutes, to remove the sea component by extraction, and dried, thus obtaining an artificial leather substrate of 1.4 mm that included 12 mass % of polyurethane and a non-woven fabric of ultrafine fibers with an average fineness of 0.08 dtex. The artificial leather substrate with a thickness of 1.4 mm was cut in half, and the sliced surface was buffed so as to adjust the thickness. Furthermore, the surface opposite to the sliced surface was buffed, thus obtaining a suede-like artificial leather that had a suede-like napped surface and had a polyurethane content or 12 masses, a basis weight of 253 g/m$^2$, an apparent density of 0.496 g/cm$^3$, and a thickness of 0.51 mm.

Then, an emulsion of a vinyl chloride-vinyl acetate copolymer having the copolymerization ratio and the properties as shown in Table 2 was gravure coated to the back surface of the suede-like artificial leather relative to the suede-like napped surface, and dried, thus forming a resin layer of the vinyl chloride-vinyl acetate copolymer having a resin basis weight of 50 g/m$^2$. In this manner, a decorative molding sheet was obtained that included the suede-like artificial leather that included the non-woven fabric containing ultrafine fibers of the modified PET with an average fineness of 0.08 dtex and 12 mass % of polyurethane, and the resin layer that was formed on the back surface relative to the napped surface, and that contained the vinyl chloride-vinyl acetate copolymer. The obtained decorative molding sheet had a basis weight of 303 g/m$^2$, an apparent density of 0.541 g/cm$^3$, and a thickness of 0.56 mm.

Then, the decorative molding sheet was subjected to hot press molding at a mold temperature of 100° C. and a pressing pressure of 100 kg/cm$^2$, using a press mold for shaping the decorative molding sheet into a shape corresponding to the same injection molding mold as that used in Example 1, thus molding a preform molded body, and the shape stability was evaluated in the same manner as in Example 1.

Then, using the obtained preform molded body, in-molding was performed in the same manner as in Example 1, to obtain a decorative molded body in which the preform molded body was integrated with the surface of the resin molded body of the ABS resin.

Then, the obtained decorative molded body was evaluated in the same manner as in Example 1. The results are shown in Table 2 below.

TABLE 2

| | Example No. | | | | | | | |
|---|---|---|---|---|---|---|---|---|
| | Ex. 11 | Ex. 12 | Ex. 13 | Ex. 14 | Ex. 15 | Ex. 16 | Com. Ex. 6 | Com. Ex. 7 |
| Spinning condition | Composite | Composite | Composite | Composite | Composite | Composite | Composite | Composite |
| Type of ultrafine fibers | Modified PET | Modified PET | Modified PET | Modified PET | Modified PET | Modified PET | Modified PET | Modified PET |
| Polyurethane content (mass %) | 12 | 12 | 12 | 12 | 12 | 12 | 0 | 0 |
| Surface finishing | Suede-like | Grain-finished | Suede-like | Suede-like | Suede-like | Suede-like | Suede-like | Suede-like |
| Vinyl chloride/vinyl, acetate copolymerization ratio (%) | 87/13 | 87/13 | 98/2 | 50/50 | 87/13 | 87/13 | 87/13 | None |
| Glass transition temperature of vinyl chloride-vinyl acetate copolymer (° C.) | 70 | 70 | 80 | 57 | 70 | 70 | 70 | — |
| Resin basis weight of vinyl chloride-vinyl acetate copolymer (g/m$^2$) | 50 | 50 | 51 | 50 | 150 | 23 | 54 | — |
| Bases weight (g/m$^2$) | 303 | 408 | 299 | 302 | 411 | 287 | 525 | 471 |
| Thickness (mm) | 0.56 | 0.56 | 0.56 | 0.55 | 0.62 | 0.54 | 0.90 | 0.88 |
| Apparent density (g/cm$^3$) | 0.541 | 0.729 | 0.534 | 0.549 | 0.663 | 0.531 | 0.583 | 0.535 |
| Shape stability | A | A | B | C | A | B | B | B |
| Positional accuracy of preform molded body | A | A | A | B | C | A | B | C |

TABLE 2-continued

| | Example No. | | | | | | | |
|---|---|---|---|---|---|---|---|---|
| | Ex. 11 | Ex. 12 | Ex. 13 | Ex. 14 | Ex. 15 | Ex. 16 | Com. Ex. 6 | Com. Ex. 7 |
| Smoothness near weld line | B | B | A | B | A | C | C | C |
| Adhesion of preform molded body to resin molded body | A | A | C | A | B | B | C | E |

Example 12

The artificial leather substrate obtained in Example 11 was cut in half, and the sliced surface was buffed so as to adjust the thickness. Thereafter, the surface opposite to the sliced surface was buffed, and a grain-finished resin layer of polyurethane was bonded to and stacked on the suede-like napped surface by dry forming, thus obtaining a grain-finished artificial leather. A decorative molding sheet and a decorative molded body were produced and evaluated in the same manner as in Example 11 except that the grain-finished artificial leather was used in place of the suede-like artificial leather in Example 11. The results are shown in Table 2.

Examples 13 to 16

Decorative molding sheets and decorative molded bodies were produced and evaluated in the same manner as in Example 11 except that the copolymerization ratios of the vinyl chloride-vinyl acetate copolymers or the resin basis weights in the resin layers of the vinyl chloride-vinyl acetate copolymers were changed as shown in Table 2. The results are shown in Table 2.

Comparative Example 6

A decorative molding sheet and a decorative molded body were produced and evaluated in the same manner as in Example 11 except that the step of impregnating polyurethane was omitted in the production of the artificial leather substrate of Example 11 and that the thickness was changed. The results are shown in Table 2.

Comparative Example 7

A decorative molding sheet and a decorative molded body were produced and evaluated in the same manner as in Example 11 except that the step of impregnating polyurethane was omitted in the production of the artificial leather substrate of Example 11, that the thickness was changed, and also that the resin layer of the vinyl chloride-vinyl acetate copolymer was not formed. The results are shown in Table 2.

As shown in Table 2, in the case of using, as the decorative molding sheets, the artificial leather substrates of Examples 11 to 16, which included the non-woven fabrics of ultrafine fibers of the modified PET, the shape stability of the preform molded body was C or above, and the adhesion of the preform molded body to the resin molded body was also C or above. On the other hand, in the case of Comparative Example 6, in which the decorative molding sheet in which the non-woven fabric was not impregnated with polyurethane was used, all of the shape stability, the positional accuracy, and the smoothness were inferior to those of Example 11. In the case of Comparative Example 7, in which the resin layer of the vinyl chloride-vinyl acetate copolymer was not formed, the evaluation result of the adhesion, in particular, was E, which was significantly lower than that of Example 11.

INDUSTRIAL APPLICABILITY

The decorative molding sheet and the decorative molded body according to the present invention can be suitably used for applications in which the surface of a molded article serving as a casing of a mobile phone, a mobile device or a home electrical appliance, an interior part of a vehicle, an aircraft or the like, an exterior member of a building material, an article of furniture or the like is decorated in a leather-like fashion.

REFERENCE SIGNS LIST

1 . . . Non-woven fabric
2 . . . Elastic polymer
3 . . . Artificial leather substrate
6 . . . Preform molded body
7 . . . Unnecessary portion
8 . . . Resin molded body
10 . . . Decorative molding sheet
20 . . . Decorative molded body

The invention claimed is:
1. A decorative molding sheet, comprising:
an artificial leather substrate that includes a non-woven fabric containing ultrafine fibers with an average fineness of 0.001 to 1 dtex and an elastic polymer applied in the non-woven fabric, and that has a leather-like finished surface; and
a resin layer that is formed on a back surface of the artificial leather substrate relative to the leather-like finished surface, and that contains a vinyl chloride-vinyl acetate copolymer,
wherein an amount of the resin layer containing the vinyl chloride-vinyl acetate copolymer, per unit area of a surface on which the resin layer is formed is 25 to 200 g/m².
2. The decorative molding sheet according to claim 1, wherein a vinyl acetate unit content in the vinyl chloride-vinyl acetate copolymer is 5 to 25 mol %.
3. The decorative molding sheet according to claim 1, wherein the vinyl chloride-vinyl acetate copolymer has a glass transition temperature of 65 to 85° C.
4. The decorative molding sheet according to claim 1, wherein the amount of the resin layer is 50 to 100 g/m².
5. The decorative molding sheet according to claim 1, wherein the artificial leather substrate contains 10 to 40 mass % of the elastic polymer.
6. The decorative molding sheet according to claim 1, wherein the elastic polymer is polyurethane.
7. The decorative molding sheet according to claim 1, wherein the leather-like finished surface is a napped surface formed by napping the ultrafine fibers.

8. The decorative molding sheet according to claim 1, wherein the leather-like finished surface is a resin layer stacked on a surface of the artificial leather substrate.

9. The decorative molding sheet according to claim 1, wherein the ultrafine fibers include nylon ultrafine fibers.

10. A preform molded body, obtained by shaping the decorative molding sheet according to claim 1 into a three-dimensional shape.

11. A decorative molded body, comprising:
a resin molded body; and
a skin layer disposed on a surface of the resin molded body,
wherein the skin layer is the decorative molding sheet according to claim 1.

12. The decorative molding sheet according to claim 2, wherein the vinyl chloride-vinyl acetate copolymer has a glass transition temperature of 65 to 85° C.

13. The decorative molding sheet according to claim 12, wherein the artificial leather substrate contains 10 to 40 mass % of the elastic polymer.

14. The decorative molding sheet according to claim 13, wherein the ultrafine fibers include nylon ultrafine fibers.

15. The decorative molding sheet according to claim 14, wherein the elastic polymer is polyurethane.

16. The decorative molding sheet according to claim 15, wherein the leather-like finished surface is a napped surface formed by napping the ultrafine fibers.

17. The decorative molding sheet according to claim 15, wherein the leather-like finished surface is a resin layer stacked on a surface of the artificial leather substrate.

* * * * *